(12) United States Patent
Keal (10) Patent No.: US 10,359,297 B2
(45) Date of Patent: Jul. 23, 2019

(54) SYSTEM AND METHOD FOR SENSOR CALIBRATION

(71) Applicant: INVENSENSE, INC., San Jose, CA (US)

(72) Inventor: William Kerry Keal, Santa Clara, CA (US)

(73) Assignee: INVENSENSE, INC., San Jose, CA (US)

(*) Notice: Subject to any disclaimer, the term of this patent is extended or adjusted under 35 U.S.C. 154(b) by 803 days.

(21) Appl. No.: 14/644,171

(22) Filed: Mar. 10, 2015

(65) Prior Publication Data

US 2016/0265937 A1    Sep. 15, 2016

(51) Int. Cl.
*G01C 25/00* (2006.01)
*G01P 21/00* (2006.01)

(52) U.S. Cl.
CPC .......... *G01C 25/005* (2013.01); *G01P 21/00* (2013.01)

(58) Field of Classification Search
CPC .............................. G01C 25/005; G01P 21/00
See application file for complete search history.

(56) References Cited

U.S. PATENT DOCUMENTS

| | | | |
|---|---|---|---|
| 9,417,689 B1* | 8/2016 | Ramaswamy | G06F 3/01 |
| 2010/0312513 A1* | 12/2010 | Mayor | G01R 33/0035 |
| | | | 702/104 |
| 2011/0066395 A1* | 3/2011 | Judd | G01C 19/56 |
| | | | 702/104 |
| 2013/0158928 A1* | 6/2013 | Hogdal | G01C 21/20 |
| | | | 702/104 |
| 2014/0343885 A1* | 11/2014 | Abrahamsson | G01C 22/006 |
| | | | 702/96 |

* cited by examiner

*Primary Examiner* — Justin Seo
*Assistant Examiner* — John M Royston
(74) *Attorney, Agent, or Firm* — Minisandram Law Firm; Raghunath S. Minisandram (57) ABSTRACT

A method and system to determine orientation of a device is disclosed. The device includes a plurality of sensors. A first signal indicative of an orientation of the device is generated using at least a first subset of sensors, with at least one sensor. A second signal indicative of the orientation of the device is generated using at least a second subset of sensors, with at least one sensor. The first signal and the second signal is compared to determine if indicated orientation is acceptable. If the orientation is not acceptable, one or more sensors are calibrated.

34 Claims, 8 Drawing Sheets

| COMBINATION | FIRST SUBSET | SECOND SUBSET |
|---|---|---|
| 1 | Gyroscope | Accelerometer Magnetometer |
| 2 | Gyroscope | Gyroscope Accelerometer |
| 3 | Gyroscope Accelerometer | Gyroscope Accelerometer Magnetometer |
| 4 | Accelerometer Compass | Gyroscope Accelerometer Magnetometer |
| 5 | Gyroscope Accelerometer | Magnetometer Accelerometer |
| 6 | Gyroscope | Gyroscope Accelerometer Magnetometer |
| 7 | Accelerometer | Accelerometer Gyroscope |

FIGURE 3A

| FIRST COMBINATION | RESULT | SECOND COMBINATION | RESULT | CONCLUSION |
|---|---|---|---|---|
| 6 | NOT ACCEPTABLE | 4 | ACCEPTABLE | CALIBRATE GYROSCOPE |
| 2 | NOT ACCEPTABLE | 4 | ACCEPTABLE | CALIBRATE GYROSCOPE |
| 1 | NOT ACCEPTABLE | 4 | ACCEPTABLE | CALIBRATE GYROSCOPE |
| 2 | ACCEPTABLE | 6 | NOT ACCEPTABLE | CALIBRATE MAGNETOMETER |
| 2 | ACCEPTABLE | 3 | NOT ACCEPTABLE | CALIBRATE MAGNETOMETER |
| 2 | ACCEPTABLE | 5 | NOT ACCEPTABLE | CALIBRATE MAGNETOMETER |
| 1 | NOT ACCEPTABLE | N/A | N/A | SOME SENSOR BAD |
| 5 | NOT ACCEPTABLE | N/A | N/A | SOME SENSOR BAD |
| 5 | ACCEPTABLE | N/A | N/A | ALL SENSORS GOOD |

SYSTEM AND METHOD FOR SENSOR CALIBRATION

TECHNICAL FIELD

The present invention relates generally to microelectromechanical systems (MEMS) device and more particularly, to MEMS devices with one or more sensors.

DESCRIPTION OF RELATED ART

MEMS devices are formed using various semiconductor manufacturing processes. MEMS devices may have fixed and movable portions. MEMS force sensors have one or more sense material, which react to an external influence imparting a force onto the movable portions. The sense material can be the MEMS structural layer or a deposited layer. The MEMS force sensor may be configured to measure these movements induced by the external influence to determine the type and extent of the external influence.

Sometimes, large external acceleration or shock may impart undesirable movements of the movable portions. These undesirable movements may induce false measurements or introduce errors into the measurement capabilities of the MEMS device. Sometimes, sensor outputs may drift over time, introducing errors in the measurement capabilities. Sensors may have to be re-calibrated periodically to eliminate potential spurious errors introduced in the measurements. Calibration of a sensor may require computing cycles from a host device coupled to the MEMS device, which may result in significant consumption of power of the host device. Further, a host device or a MEMS device may include a plurality of sensors and re-calibrating all the sensors may consume significant power of the host device. It may be desirable to minimize the number of calibration or recalibration of the sensors.

With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method to determine orientation of a device is disclosed. The method includes providing a plurality of sensors. A first signal indicative of an orientation of the device is generated using at least a first subset of sensors, with at least one sensor. A second signal indicative of the orientation of the device is generated using at least a second subset of sensors, with at least one sensor. The first signal and the second signal are compared to determine if indicated orientation is acceptable.

In yet another embodiment, a system to determine orientation of a device is disclosed. The system includes a plurality of sensors. A first signal indicative of an orientation of the device is generated using at least a first subset of sensors, with at least one sensor. A second signal indicative of the orientation of the device is generated using at least a second subset of sensors, with at least one sensor. The first signal and the second signal are compared to determine if indicated orientation is acceptable.

In yet another embodiment, a method to initiate calibration of a sensor in a device is disclosed. The method includes providing at least one sensor. The output of the sensor is measured. The output of the sensor is converted to a signal indicative of orientation of the device in a stationary frame. The converted output is compared to a threshold value. If the converted output is outside a threshold value, calibration of the sensor is initiated.

In yet another embodiment, a system to calibrate a sensor in a device is disclosed. The system includes at least one sensor. The output of the sensor is measured. The output is converted to a signal indicative of orientation of the device in a stationary frame. The converted output is compared to a threshold value. If the converted output is outside a threshold value, calibration of the sensor is initiated.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following Figures.

DETAILED DESCRIPTION

To facilitate an understanding of the adaptive aspects of the present disclosure, an exemplary system and method for calibration of one or more sensors of a system with a plurality of sensors is described. The specific construction and operation of the adaptive aspects of the system and method for calibration of one or more sensors of a system with a plurality of sensors of the present disclosure are described with reference to an exemplary host device.

Figure 1:
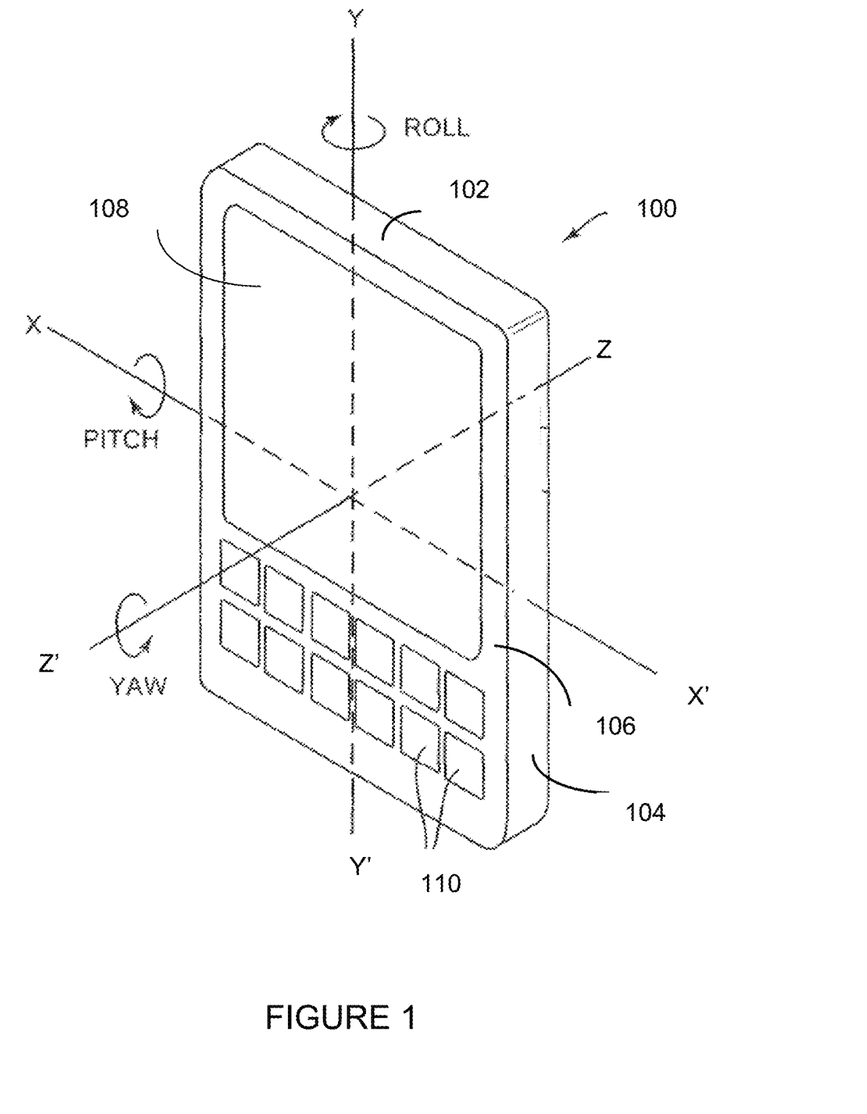
FIG. 1 shows a host device, with various orientation axes with reference to the device frame, according to one aspect of the present disclosure.

FIG. 1 shows a host device 100, in accordance with an embodiment of this disclosure. The orientation of the host device 100 is defined using a device frame defined by a first side 102, a second side 104 and a third side 106 of the device. As one skilled in the art appreciates, the first side 102, second side 104 and third side 106 are substantially orthogonal to each other. In one example, the host device 100 may be a mobile device, with a display screen 108 disposed over the third side 106. In some examples, the host device 100 may further include one or more input devices, for example, one or more buttons 110. As one skilled in the art appreciates, the host device 100 may be a computing device. In some examples, the host device may be a general purpose computing device. In yet another examples, the host device may be a special purpose computing device. For example, the host device may be a cell phone, a watch, a gaming device, a navigation device and the likes.

In one example, an X-axis of the device frame may be defined by a line X-X' running substantially parallel to the first side 102 and substantially perpendicular to the second side 104. Similarly, a Y-axis of the device frame may be defined by a line Y-Y' running substantially parallel to the second side 104 and substantially perpendicular to the first side 102. A Z-axis of the device frame may be defined by a line Z-Z', orthogonal to both the X-axis and the Y-axis, and substantially orthogonal to the third side 106. As one skilled in the art appreciates, rotation along the X-axis may be sometimes referred to as a pitch, rotation along the Y-axis may be sometimes referred to as a roll and rotation along the Z-axis may be sometimes referred to as yaw.

Figure 2:
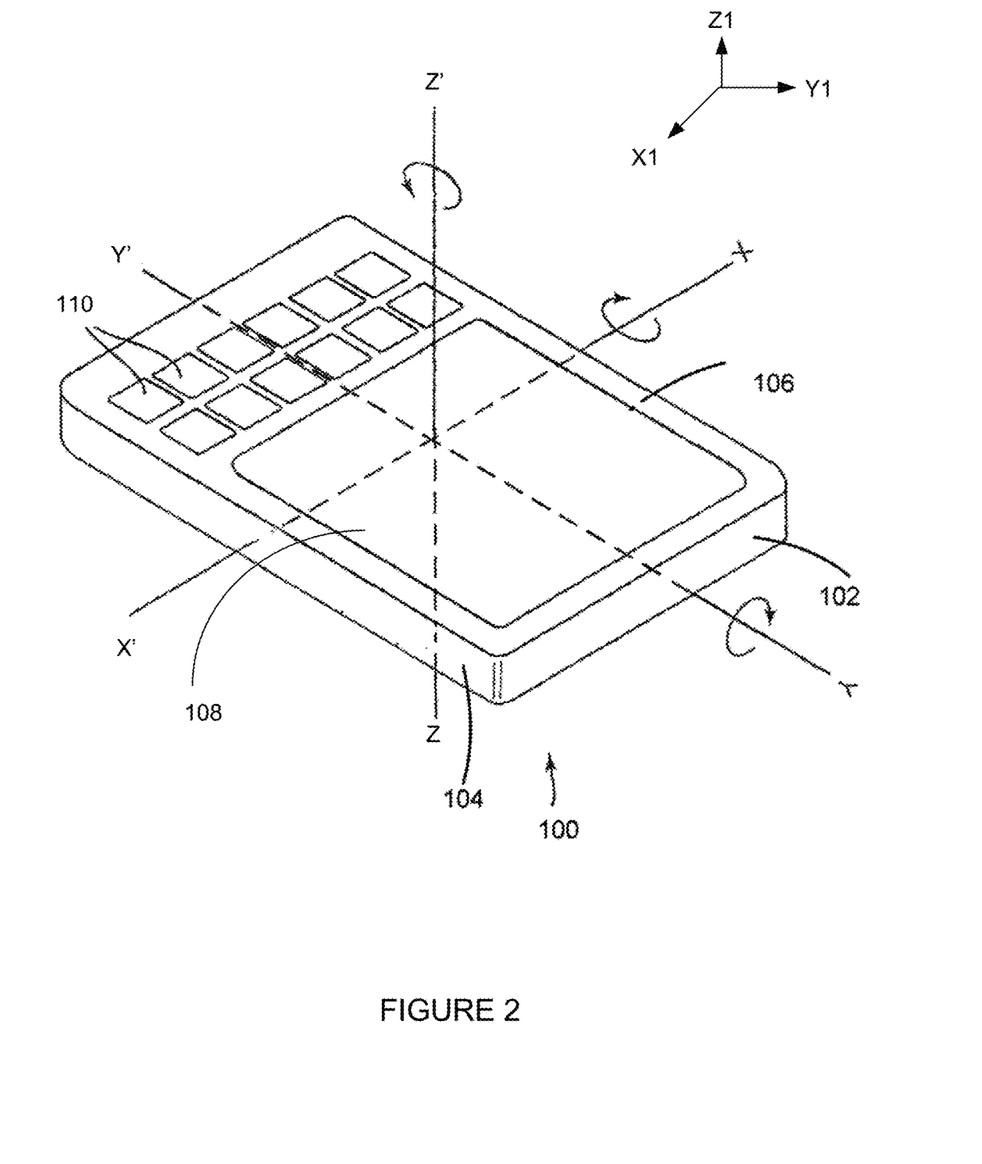
FIG. 2 shows the host device, with various orientation axes with reference to a stationary frame, according to one aspect of the present disclosure.

Now, referring to FIG. 2, an example orientation of the host device 100 with reference to a stationary frame will be described. In this example, a stationary reference frame with orthogonal axes X1, Y1, Z1 is defined. This reference frame is independent of the orientation of the host device 100. In some examples, one or more axes of the reference frame may correspond to a known orientation. For example, in some examples, the Z1 axis of the reference frame may correspond to earth's gravitational force axis. In this example, the Z axis of the host device 100 is aligned with the Z1 axis of the stationary frame. Host device 100 may be moved or rotated, which changes the alignment between the axes of the device frame and the axes of the stationary frame. As one skilled in the art appreciates, the orientation of the host device is defined as the orientation of the axes of the device frame with respect to the axes of the stationary frame. For example, the orientation may be expressed using Euler angles, rotation matrix, or quaternions. The orientation may be thought of in terms of rotations because they describe how to rotate the host device 100 so that the axes of the device frame are aligned with the axes of the stationary frame.

One or more sensors embedded in the host device 100 may provide signals to determine the orientation of the host device with reference to the stationary frame of reference. Now, referring to FIG. 3, an example system 300 with a plurality of sensors will be described. System 300 includes a plurality of sensors 302a, 302b and 302c. In one example, sensor 302a is a gyroscope, sensor 302b is an accelerometer, and sensor 302c is a magnetometer. In some examples, a gyroscope may be referred to as a gyrometer. The system further includes a first orientation module 308 and a second orientation module 310. First orientation module 308 is configured to receive output of a first subset of sensors. Second orientation module 310 is configured to receive output of a second subset of sensors. First subset of sensors and second subset of sensors may be a one or more of the sensors 302a, 302b and 302c. Although the first orientation module 308 and the second orientation module 310 are shown as separate blocks, they may be configured as a single orientation module that processes the outputs from the first subset of sensors and the second subset of sensors in parallel or sequentially. Possible combinations for first subset of sensors and second subset of sensors will be further described with reference to FIG. 3A.

Figure 3:
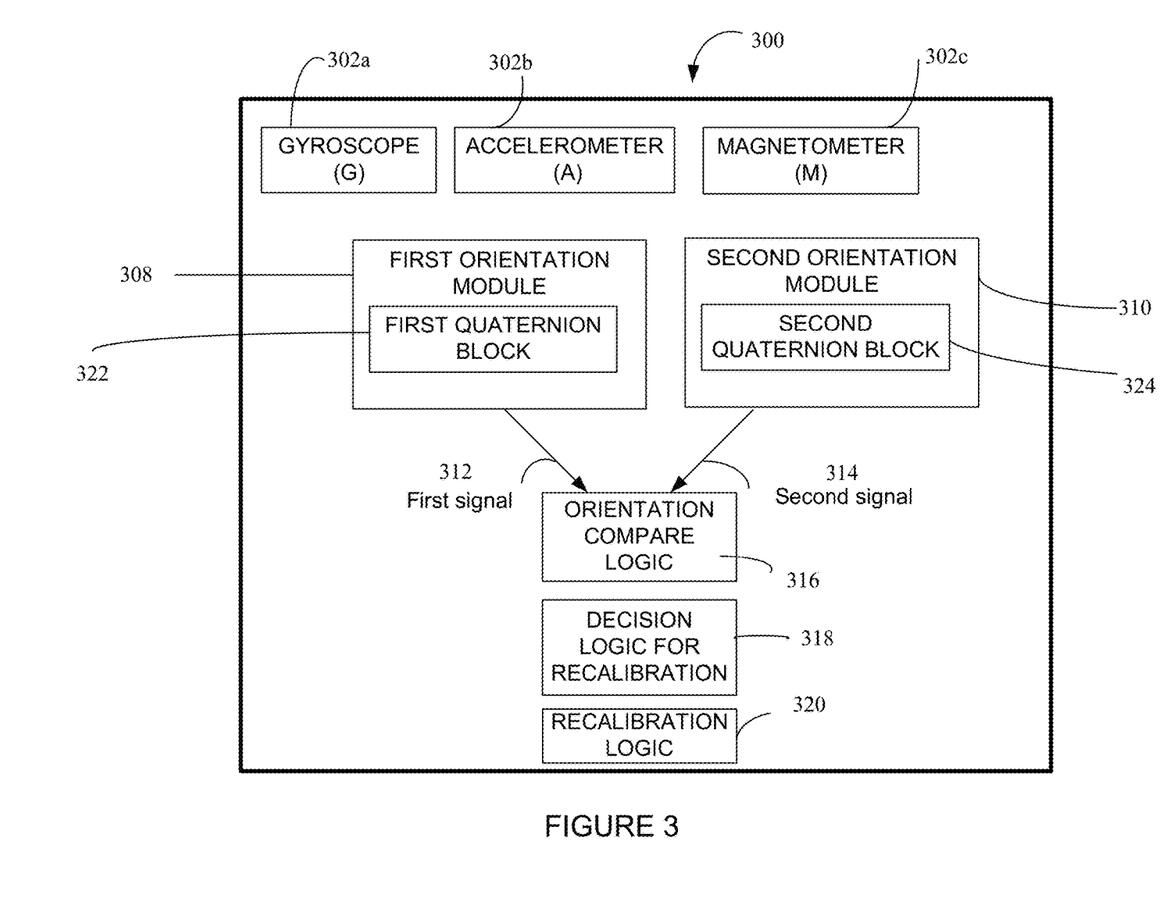
FIG. 3 shows a block diagram of a system with a plurality of sensors.

The first orientation module 308 receives the signals from the first subset of sensors, and uses these signals to generate a first signal 312 indicative of an orientation of the host device 100 with reference to the stationary frame. The second orientation module 310 receives the signals from the second subset of sensors, and uses these signals to generate a second signal 314 indicative of an orientation of the host device 100 with reference to the stationary frame. The first signal 312 and the second signal 314 do not necessarily need to represent the complete orientation of the device in three dimensions. The orientation may only represent a part of the complete orientation, for example, the orientation may represent a roll, pitch or yaw angle, or a combination thereof. The orientation may also be expressed as a subset of a quaternion or a rotation matrix. The orientation may also be expressed with respects to a single axis, for example, the orientation (angle) with respect to the gravity axis or the North-South axis. In order to be able to compare the first signal and the second signal, both signals may represent a similar part of the orientation. The first signal 312 and the second signal 314 may also represent a derivative of the orientation. For example, the signals may represent an orientation change over a certain period of time, e.g. a rotation speed in one or more directions.

First signal 312 and second signal 314 are fed to an orientation compare logic 316. The orientation compare logic 316 compares the first signal 312 and second signal 314 to determine if the difference in orientation is within a threshold value. In other words, the orientation compare logic 316 determines a difference between the orientation calculated using the signals from the first subset of sensors, and the orientation calculated using the signals from the second subset of sensors. As one skilled in the art appreciates, there may be many applicable norms to compute a difference. If the difference in orientation is not within a threshold value, then the orientation compare logic 316 generates an error signal. The error signal is fed to a decision logic 318 to determine which of the sensors may need recalibration, based on the error signal. Upon such determination, a re-calibration of one or more sensors is initiated by the re-calibration logic 320. The method described here may also be used to determine if one or more sensors are malfunctioning. The malfunction may be temporary or permanent. The malfunction may be caused by internal or external factors. If the calibration process does not resolve the observed errors in orientation, in some examples, it may indicate a malfunction of one or more sensors. In some examples, periodic retesting may be performed to determine if the indicated malfunction is temporary or permanent.

Figure 3A:
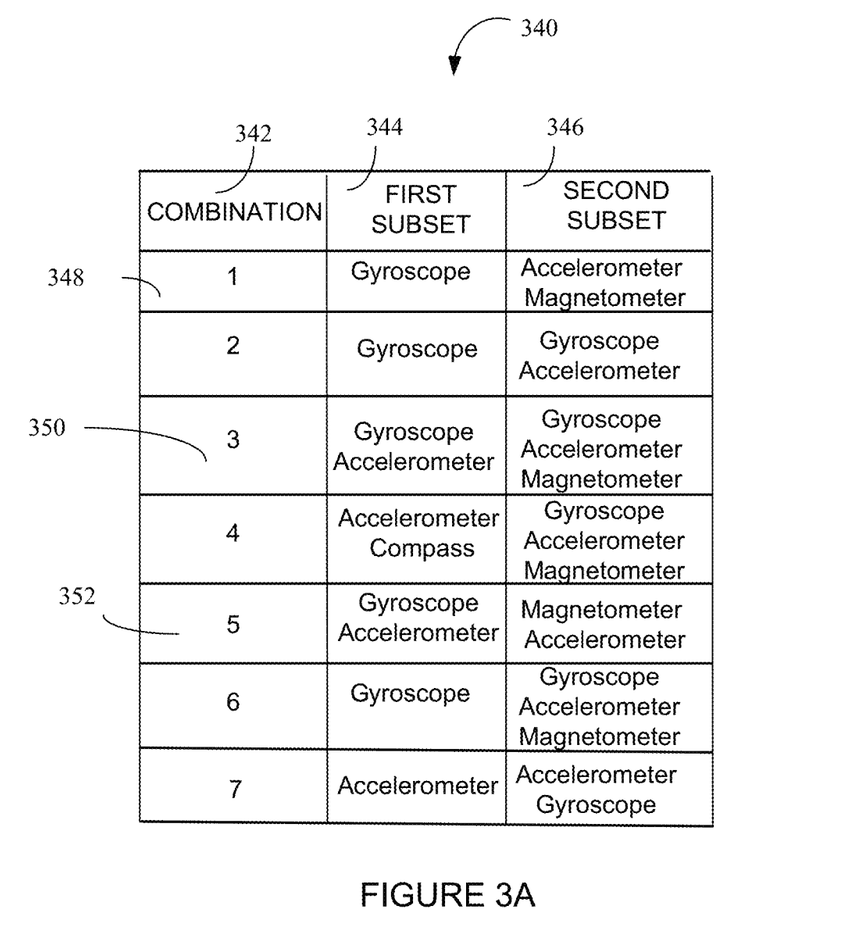
FIG. 3A shows a table with various combinations of a first subset and a second subset of sensors of the system of FIG. 3, according to one aspect of the present disclosure.

Now, referring to FIG. 3A, table 340 shows some examples of the possible combinations of first subset of sensors and second subset of sensors. For example, column 342 refers to various combinations. Column 344 shows possible combinations for first subset of sensors and column 346 shows possible combinations for second subset of sensors. As an example, referring to row 348, for combination 1, first subset of sensors is a gyroscope and corresponding second subset of sensors are an accelerometer and a magnetometer. Similarly, referring to row 350, for combination 3, first subset of sensors is a gyroscope and an accelerometer and corresponding second subset of sensors are a gyroscope, an accelerometer and a magnetometer. Although table 340 shows different sensors in the first subset and the second subset, in some examples, the sensors in the first subset and the second subset may be same.

When using a subset that consists of a combination of sensors that cannot determine a complete orientation, the orientation is initially set equal to a reference orientation based on another subset of sensors. For example, if a subset is used that consists only of a gyroscope, a reference orientation needs to be defined because the gyroscope measures an orientation change, and not an absolute orientation. Consider for example row 348, where the reference orientation for the first subset (gyroscope) may be set equal to the orientation determined by the second subset (accelerometer+magnetometer). The gyroscope is then used to determine the orientation by integrating the orientation change over time with respect to this reference orientation. At a later point in time, when the orientation of the host device has changed, the orientation based on the first subset can be compared to the orientation based on the second subset to determine if one of the sensors needs to be calibrated. If all sensors are functioning properly, i.e. they do not need calibration, the orientation based on the gyroscope only should still match the orientation based on the accelerometer-magnetometer combination. As one skilled in the art would appreciate, above process may also be used to calculate a difference between two orientations over time. This difference in orientation may be obtained from a gyroscope or from the above mentioned accelerometer, magnetometer combination.

Now, referring back to FIG. 3, various sensors for example, gyroscope 302a, accelerometer 302b and magnetometer 302c provide raw data indicative of orientation. As one skilled in the art appreciates, each sensors may have 3 axes, which are aligned with the axes of the device frame. If the sensors are not perfectly aligned with the axes of the device, small corrections may be performed so that the 3 axes of sensors output signals correspond the orthogonal axes of the device. The sensor signals for the various axes of the device frame are used by the orientation modules to calculate the orientation of the host device 100 with respect to the stationary frame.

The combination of the different sensor signals is often referred to as sensor fusion. For example, the accelerometer measures the acceleration on the different axes of the device frame, from which the orientation of the host device with respect to gravity can be determined. In a similar manner, the orientation of the host device with respect to the earth's magnetic field can be determined using the magnetometer signals. In addition, the gyroscope measures the angular rotation rate of the host device over the different axes of the device frame. By integrating the gyroscope signals on the different axes, the rotational angles over the different axis of the host device 100 can be calculated, from which a change in orientation over time can be deduced.

The fusion of the information from the different sensors can give the complete orientation of the host device with respect to the stationary frame or a subset of the complete orientation. The sensor fusion algorithm implemented in the first orientation module 308 depends on the sensors in the first subset of sensors. The sensor fusion algorithm implemented in the second orientation module 310 depends on the sensors in the second subset of sensors.

The orientation of the host device with respect to the stationary frame as calculated by the first orientation module 308 and second orientation module 310 may be expressed in many different forms as discussed above. For example, if well-known Euler angles are used, the orientation will be described by subsequent rotations over the yaw axis, the pitch axis and the roll-axis. As one skilled in the art appreciates, the Euler angles have may different conventions. In some examples, one can use a single rotation matrix convention to represent the orientation. Alternatively, instead of performing 3 sequential rotations, quaternions techniques may be used to express the orientation in a single rotation or single operation. The use of quaternions in the first orientation module 308 to determine the first signal 312, representative of the orientation of the device in the stationary frame will now be discussed. The use of quaternions in the second orientation module 310 follows a similar implementation. For example, a first quaternion block 322 may be provided in the first orientation module 310. The first quaternion block 322 may perform quaternion transformations as described below to perform the calculation and representation of the orientation. Similarly, a second quaternion block 324 may be provided in the second orientation module 310. The second quaternion block 324 may perform quaternion transformations as described below to perform the calculation and representation of the orientation.

A unit quaternion, also referred to as quaternion is a 4-element vector that describes how to go from a first orientation to a second orientation using a single rotation over a unit vector. In this example, the quaternion rotation expresses the orientation of the host device as a rotation of the host device that would align the axes of the device frame with the axes of the stationary frame (as discussed above). Quaternion and unit quaternion are used interchangeable in this document. A unit quaternion has a scalar term and 3 imaginary terms. In this disclosure, the scalar term is indicated first followed by the imaginary term. In equation 1, for a quaternion, the angle $\theta$ is the amount rotated about the unit vector, $[u_x, u_y, u_z]$.

$$\overline{Q} = \begin{bmatrix} \cos\left(\frac{\theta}{2}\right) \\ \sin\left(\frac{\theta}{2}\right) \cdot u_x \\ \sin\left(\frac{\theta}{2}\right) \cdot u_y \\ \sin\left(\frac{\theta}{2}\right) \cdot u_z \end{bmatrix} \quad \text{Equation 1}$$

A quaternion multiplication is defined in Equation 2. The "$\otimes$" will represent quaternion multiplication in this document.

$$\overline{Q_2} = \begin{bmatrix} q_{2w} \\ q_{2x} \\ q_{2y} \\ q_{2z} \end{bmatrix} \quad \text{Equation 2}$$

$$\overline{Q_1} \otimes \overline{Q_2} = \begin{bmatrix} q_{1w} \cdot q_{2w} - q_{1x} \cdot q_{2x} - q_{1y} \cdot q_{2y} - q_{1z} \cdot q_{2z} \\ q_{1w} \cdot q_{2x} + q_{1x} \cdot q_{2w} + q_{1y} \cdot q_{2z} - q_{1z} \cdot q_{2y} \\ q_{1w} \cdot q_{2y} - q_{1x} \cdot q_{2z} + q_{1y} \cdot q_{2w} + q_{1z} \cdot q_{2x} \\ q_{1w} \cdot q_{2z} + q_{1x} \cdot q_{2y} - q_{1y} \cdot q_{2y} - q_{1z} \cdot q_{2z} \end{bmatrix}$$

A quaternion inverse is defined in Equation 3.

$$\overline{Q_1'} = \begin{bmatrix} q_{1w} \\ -q_{1x} \\ -q_{1y} \\ -q_{1z} \end{bmatrix} \quad \text{Equation 3}$$

Given angular velocity in radians/second in Equation 4, with magnitude wm shown in Equation 5, with a gyroscope data $[\omega_x, \omega_y, \omega_z]$ sampled with timesteps of t, a quaternion can be defined as described below with reference to Equation 6:

$$\omega = [\omega_x, \omega_y, \omega_z] \quad \text{Equation 4}$$

$$\omega_m = \sqrt{\omega_x \cdot \omega_x + \omega_y \cdot \omega_y + \omega_z \cdot \omega_z} \quad \text{Equation 5}$$

$$\overline{Q_w} = \begin{bmatrix} \cos\left(\omega_m \cdot \frac{t}{2}\right) \\ \frac{\omega_x}{\omega_m} \cdot \sin\left(\omega_m \cdot \frac{t}{2}\right) \\ \frac{\omega_y}{\omega_m} \cdot \sin\left(\omega_m \cdot \frac{t}{2}\right) \\ \frac{\omega_z}{\omega_m} \cdot \sin\left(\omega_m \cdot \frac{t}{2}\right) \end{bmatrix} \quad \text{Equation 6}$$

Then the quaternion update equation would be, as shown below in Equation 7:

$$\overline{Q_{N+1}} = \overline{Q_N} \otimes \overline{Q_\omega} \quad \text{Equation 7}$$

For small updates, i.e. small rotation angles, Equation 7 can be rewritten using Taylor approximations for the sine and cosine, as shown below in Equation 8:

$$\overline{Q_{N+1}} = \overline{Q_N} + \frac{t}{2} \cdot \overline{Q_N} \otimes \begin{bmatrix} 0 \\ \omega_x \\ \omega_y \\ \omega_z \end{bmatrix} \quad \text{Equation 8}$$

$$\overline{Q_{N+1}} = \frac{\overline{Q_{N+1}}}{\|\overline{Q_{N+1}}\|}$$

In Equation 8, previous quaternion is multiplied by the rotation rate from the gyroscope (in radians) using a quaternion multiply. This is scaled by the time between samples over 2 and added to the previous quaternion. Next, the quaternion is divided by the magnitude to maintain a magnitude of 1.

Now, referring to Equation 9 below, where $q_{1w}$, $q_{1x}$, $q_{1y}$ and $q_{1z}$ refers to orientation indicated by the first signal represented as a quaternion and $q_{2w}$, $q_{2x}$, $q_{2y}$ and $q_{2z}$ refers to orientation indicated by the second signal represented as a quaternion, cosine of the angle error may be determined as follows.

$$\cos\left(\frac{\text{angle\_error}}{2}\right) = \overline{Q_1} \cdot \overline{Q_2} \quad \text{Equation 9}$$

$$= \begin{bmatrix} q_{1w} \\ q_{1x} \\ q_{1y} \\ q_{1z} \end{bmatrix} \cdot \begin{bmatrix} q_{2w} \\ q_{2x} \\ q_{2y} \\ q_{2z} \end{bmatrix}$$

$$= q_{1w}q_{2w} + q_{1x}q_{2x} + q_{1y}q_{2y} + q_{1z}q_{2z}$$

As one skilled in the art appreciates, cosine of the angle error is determined by a dot product of the corresponding quaternions. In one example, the orientation compare logic 316 may be configured to perform the dot product of the quaternion. Equation 9 shows that for a very small error the dot product is close to 1. As the error angle between the two quaternions increases, the value of the dot product decreases. For example, if the two quaternion orientations would be perpendicular to each other, the dot product would be close to zero. In other words, a smaller value of cosine of the angle error indicates that orientation indicated by the first signal and second signal are significantly different, thereby indicating that one or more sensors may need calibration. One will appreciate that one can derive many different methods based on the above description to form a criterion decision. In one example, one can form the difference 1—the dot product, or 1—Norm (dot product) before applying any comparison to a threshold. In this case, the closer to 0 indicates that orientation indicated by the first signal and second signal are similar. More generally, any norm of the difference between the different quaternions may be used to express the error, such as e.g. the Euclidian norm.

In one example, a threshold value is set for the cosine of the angle error and when the cosine of the angle error is below the threshold value, a signal is generated to initiate a calibration cycle. More generally, using the criteria based on the difference between the two quaternions, a sensor malfunction detector can be built.

In some examples, cosine of the angle error may be used to generate a confidence value as related to the orientation indicated by various sensors. In other words, as the cosine of the angle error approaches a4 value of 1, the confidence value related to the orientation indicated by various sensors may be increased, meaning that the confidence that the calculated orientation is the correct orientation is high.

In the examples above, the dot product of the quaternions was used to determine the difference between the orientation based on the first subset of sensors and the orientation based on the second subset of sensors. Alternatively, the difference may also be determined using Euler angles or rotation matrices, complete or partly. For example, the difference between the Euler angles based on the first subset of sensors and the Euler angles based on the second subset of sensors may be calculated. The sum or average of the various Euler angles may then be compared to a threshold in order to determine if calibration is needed. In another example where rotation matrices are used, an error rotation matrix may be defined that expresses the difference between the rotation matrix based on the first subset of sensors and the rotation matrix based on the second subset of sensors. The trace of the error rotation matrix, which is a measure of the error angle, may then be compared to a threshold in order to determine if calibration is needed, or more generally if a sensor malfunction should be registered or reported.

Figure 3B:
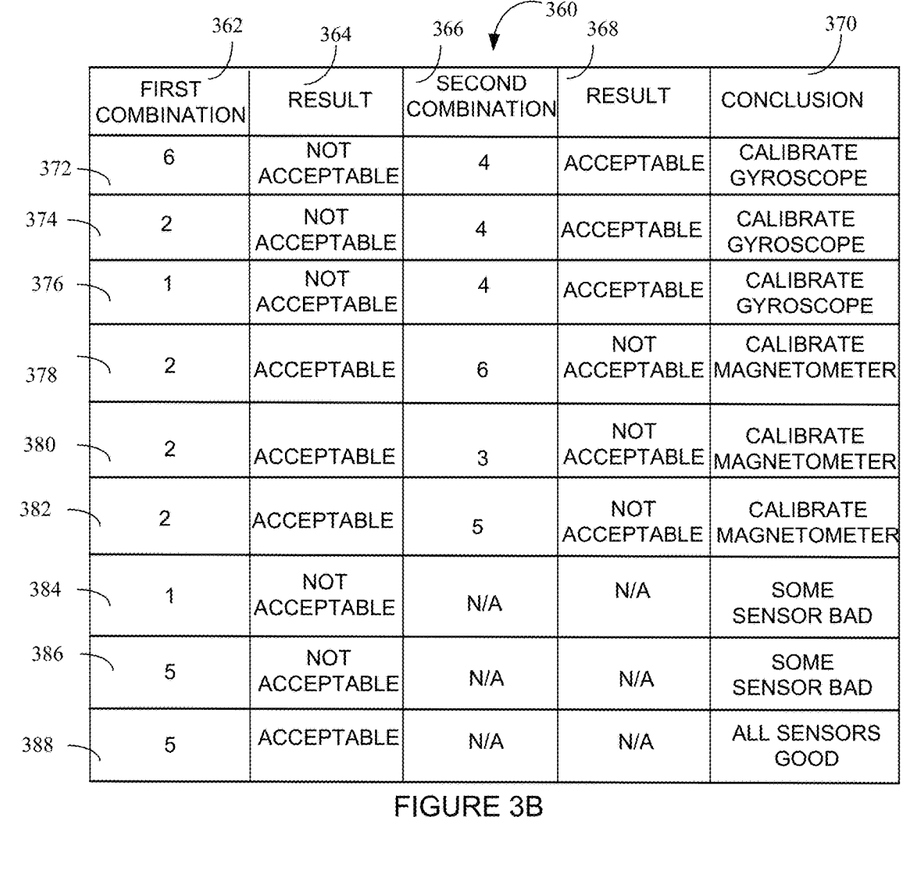
FIG. 3B shows a decision table, according to one aspect of the present disclosure.

Now, referring to FIG. 3B, a decision table 360 is shown. The decision table 360 may be used by the decision logic 318 to determine the state of various sensors, based on the orientation indicated by sensor combinations, as shown in table 340 of FIG. 3A. For example, column 362 shows a first combination of sensors, column 364 shows corresponding results of the orientation error, column 366 shows a second combination of sensors, column 368 shows corresponding results of the orientation error and column 370 shows possible conclusion. The results of the orientation error (for example, results shown in column 364 and column 368) refer to the methods above where, for example, the quaternion dot product is compared to a threshold, and where the result is acceptable when the error angle is small and the dot product is above the threshold.

For example, referring to row 372, if the result of the first combination which is combination 6 (as shown in table 340) is not acceptable and results of the second combination which is combination 4 (as shown in table 340) is acceptable, then the conclusion is that gyroscope needs calibration. In this case, in second combination 4 the orientation based on the first subset is comparable to the orientation based on the second subset even though the gyroscope, which needs calibration, is used in the second subset. However, in the sensor fusion, the error introduced by the gyroscope in need of calibration may be corrected (partially) by the accelerometer or the magnetometer. On the other hand, the first subset in the first combination only uses the gyroscope to determine the orientation, which means that no other sensors are present that might correct for the error caused by the gyroscope in need of calibration.

Now, referring to row 374, if the result of the first combination which is combination 2 (as shown in table 340) is not acceptable and results of the second combination which is combination 4 (as shown in table 340) is acceptable, then the conclusion is that gyroscope needs calibration.

Now, referring to row 376, if the result of the first combination which is combination 1 (as shown in table 340) is not acceptable and results of the second combination which is combination 4 (as shown in table 340) is acceptable, then the conclusion is that gyroscope needs calibration.

Now, referring to row 378, if the result of the first combination which is combination 2 (as shown in table 340) is acceptable and results of the second combination which is combination 6 (as shown in table 340) is not acceptable, then the conclusion is that magnetometer needs calibration.

Now, referring to row 380, if the result of the first combination which is combination 2 (as shown in table 340) is acceptable and results of the second combination which is combination 3 (as shown in table 340) is not acceptable, then the conclusion is that magnetometer needs calibration.

Now, referring to row 382, if the result of the first combination which is combination 2 (as shown in table 340) is acceptable and results of the second combination which is combination 5 (as shown in table 340) is not acceptable, then the conclusion is that magnetometer needs calibration.

Now, referring to row 384, if the result of the first combination which is combination 1 (as shown in table 340) is not acceptable, then the conclusion is that some sensor is bad or needs calibration. Because the sensors in the two subsets of sensors are different, it is inconclusive which sensors need to be calibrated.

Now, referring to row 386, if the result of the first combination which is combination 5 (as shown in table 340) is not acceptable, then the conclusion is that some sensor is bad or needs calibration.

Now, referring to row 388, if the result of the first combination which is combination 5 (as shown in table 340) is acceptable, then the conclusion is that all sensors are good and there is no need for calibration. Because the sensors in the two subsets of sensors are different, but the two subsets give identical results, these sensors must be functioning correctly.

In some examples, one or more samples of the first signal and the second signal may be generated by using different combinations of the first subset of sensors and second subset of sensors, for example, as shown with reference to table 340 and table 360. Based on the indicated orientation by various combinations of the first subset of sensors and second subset of sensors, using the decision table 360, one or more sensors may be identified for calibration.

In one example, a certain combination of a first subset of sensors and a second subset of sensors may be used at a regular interval of time to determine if there is a need for calibration. For example, if quaternions are used, the error angle may be determined at a predefined interval of e.g. one or several minutes using Equation 9 for combination 5 from FIG. 3A (row 352) where the first subset contains a gyroscope and an accelerometer, and the second subset contains a magnetometer and an accelerometer. The interval might be varied depending on for example, the types of sensors used, the specifications of the sensors, the speed of the change in orientation of the host device. In some examples, certain combination of subsets of sensors may also be used after an external event has taken place. For example, if the accelerometer detects a shock above a certain a threshold or a gyroscope detects a large rotation above a preset threshold. The type of sensors in the subsets to be tested may depend on the external event. By comparing the resulting error angle to the threshold, it can be determined if all sensors are good, or if one or more sensors need a calibration. However, which sensor needs calibration cannot be determined using combination 5. Therefore, if the outcome is that a sensors needs to be calibrated, other combinations of subsets needs to be used to determine which sensors needs calibration (as previously discussed with reference to FIG. 3B).

Instead of first testing if any sensor needs calibration, and then determining which sensor needs calibration, a periodic sensor testing procedure is also possible. In other words, for each individual sensor a test for the need for calibration is executed at a regular interval. For example, to test if the gyroscope needs calibration, the results of a first combination 6 and a second combination 4 can be compared (as discussed with reference to FIG. 3B).

For some subset of sensors it may not be possible to determine a complete orientation, so instead the best possible orientation, or quaternion, or part or derivative of the orientation will be determined given the sensors in the subset. For example, if the first subset contains only an accelerometer, and the second subset contains only a gyroscope, the evolution through time of the orientation with respect to gravity may be determined (which is e.g. defined by the tilt angle, or Pitch and Roll angle), by both sensors (but the orientation with respect to the earth's magnetic field will be unknown)

A quaternion may be chosen from the quaternions that corresponds to the accelerometer signals and set as the initial orientation. Next, this initial quaternion may be updated using the gyroscope. At a later time, the now gyroscope-based quaternion may be compared to the orientation based on the accelerometer to determine any possible errors. Depending on whether the error is stable or changes over time, other conclusions may be drawn. For example, if the error increases over time, the gyroscope bias may need recalibration.

As one skilled in the art appreciates, results of other combinations of first combination of sensors and second combinations of sensors may be used to derive additional conclusions related to the status of the sensors.

Figure 4:
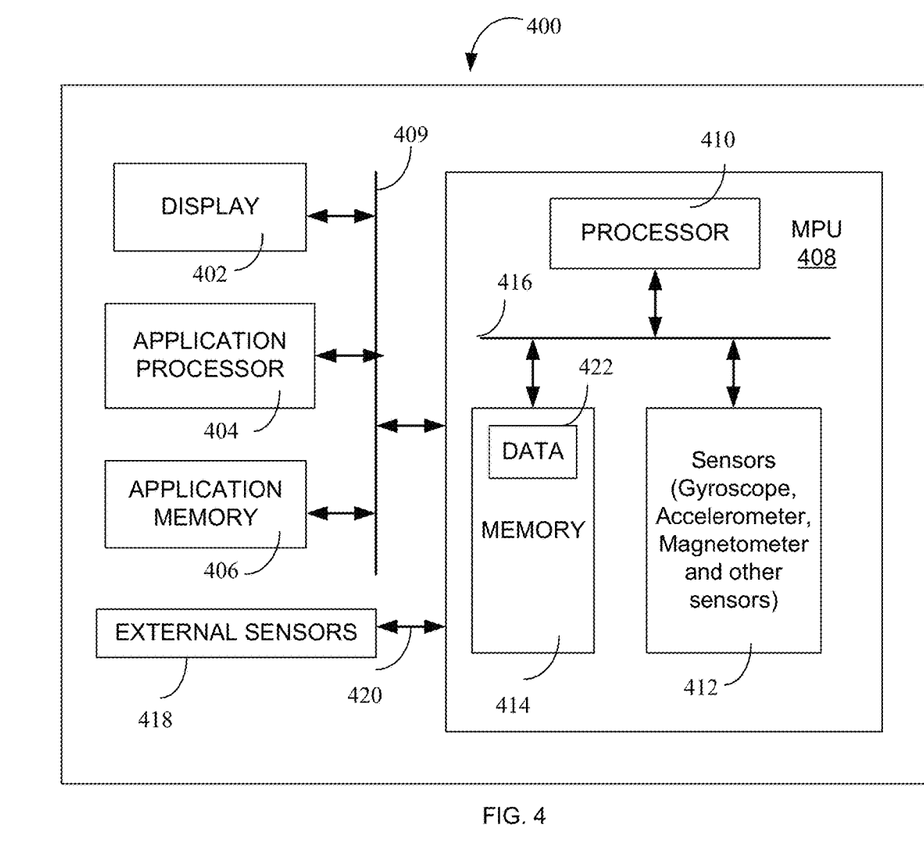
FIG. 4 shows an example host device, according to one aspect of the present disclosure.

Now, referring to FIG. 4, an example host device 400 is described. Host device 400 may be similar to host device 100 as described with reference to FIG. 1. The host device 400 includes a display 402, an application processor 404, application memory 406 and a motion processing unit 408 (sometimes referred to as MPU), all communicating over a host bus 409.

MPU 408 includes a processor 410, one or more sensors 412, a memory 414, all communicating with each other over a MPU bus 416. One or more external sensors 418 may communicate with the MPU 408 over link 420. Data 422 portion of memory 414 may be used to store permanent and transient values generated during the operation of the MPU 408. For example, information related to sensors, orientation information, signals generated during the operation, time stamp of various operations performed and the like may be stored in the data 422 portion of memory 414.

In some examples, MPU 408 may implement one or more functional modules described with reference to system 300. For example, sensors 302a, 302b and 302c of system 300 may correspond to sensors 412. In some examples, one or more sensors 302a, 302b and 302c may correspond to external sensors 418. In some examples, first orientation module 308, second orientation module 310, orientation compare logic 316, decision logic 318 and recalibration logic 320 may be implemented in the MPU 408. As one skilled in the art appreciates, these functional modules may be implemented as a hardware, software or a combination of hardware and software modules.

In some examples, one or more of these functional modules may be implemented as a software functions stored in the memory 414, which is executed by the processor 410. In some examples, some of these functional modules may be implemented as software functions stored in the application memory 406, which is executed by the application processor 404. Results of these functions may be reported back to the MPU 408. For example, recalibration logic may be implemented outside of the MPU 408 and the MPU 408 may send a signal to the processor 404 to initiate recalibration.

In one example, the MPU 408 is configured to communicate information related to orientation of the host device 400 to the application processor 404, over bus 410. The information related to orientation of the host device may be stored in the application memory 406. The stored information related to orientation may be used by one or more applications running on the host device to manipulate or change information displayed on the display 402. In some examples, the information related to orientation may indicate a gesture, based upon a change in the information related to orientation over time.

Figure 5:
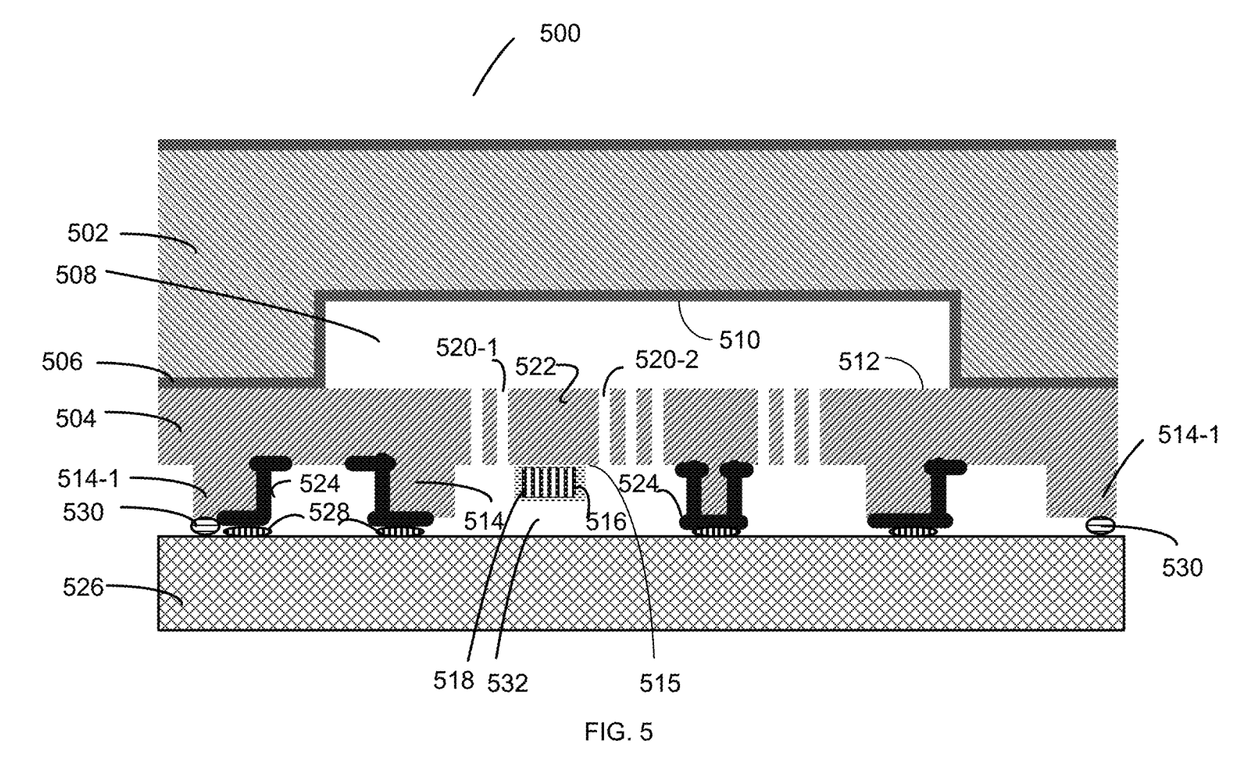
FIG. 5 shows an example MEMS device, according to one aspect of the present disclosure.

Now, referring to FIG. 5, an example MEMS device 500 is described. In some examples, MEMS device 500 may correspond to the MPU 408 described with reference to FIG. 4. Substrate 500 includes a handle layer 502 and a device layer 504. One or more sensors are formed on the device layer 504. An example magnetic sensor will be described with reference to the MEMS device 500. Magnetic sensor may be configured as a compass. As one skilled in the art appreciates, additional sensors may be formed on the device layer, for example, an accelerometer and a gyroscope.

A fusion bond layer 506 bonds the handle layer 502 to device layer 504, to form an upper cavity 508, defined by the lower side 510 of the handle layer 502 and upper side 512 of the device layer 504. Now referring to device layer 504, a plurality of standoff 514 structures are formed on the device layer 504, for example, by deep reactive ion etching (DRIE) process. Magnetic films are deposited, patterned and magnetized on the lower side 515 of the device layer 504, to form a first permanent magnet 516. The first permanent magnet 516 is oriented in a predefined direction by applying an external magnetic field.

In some embodiments, a protective layer 518 is deposited over the first permanent magnet 516, to prevent oxidization of the first permanent magnet 516.

FIG. 5 also shows trench patterns 520-1 and 520-2, an actuator 522, device pads 524, integrated circuit substrate 526, IC pads 528 and seal ring 530. A movable actuator 522 is created by forming a plurality of trench patterns 520-1 and 520-2 on the device layer 504, for example, using a DRIE process. First permanent magnet 516 is located on the first actuator 522. Next, device pads 524, preferably made of germanium alloys are deposited and patterned on the device layer 504.

Integrated circuit substrate 526 includes one or more electronic circuits that communicate with various sensors formed on the device layer 504. IC pads 528, preferably made of aluminum alloys are deposited and patterned on the integrated circuit substrate 526. IC pads 528 are coupled to device pads 524 to provide a communication path to various sensors formed on the device layer 504. For example, device pads 524 may be eutectic bonded with IC pads 528. As previously described with reference to FIG. 4 one or more components of MPU 408 for example, processor 410, memory 414 and MPU bus 416 may also be provided or fabricated on the integrated circuit substrate 526.

Standoff 514-1 surrounds various devices formed on the device layer 504. A seal ring 530 is formed on the standoff 514-1 to bond the device layer 504 with integrated circuit substrate 526, for example, to hermetically seal various devices formed on the device layer 504. Height of the standoff 514-1, along with seal ring 530 define height of the lower cavity 532.

Figure 6:
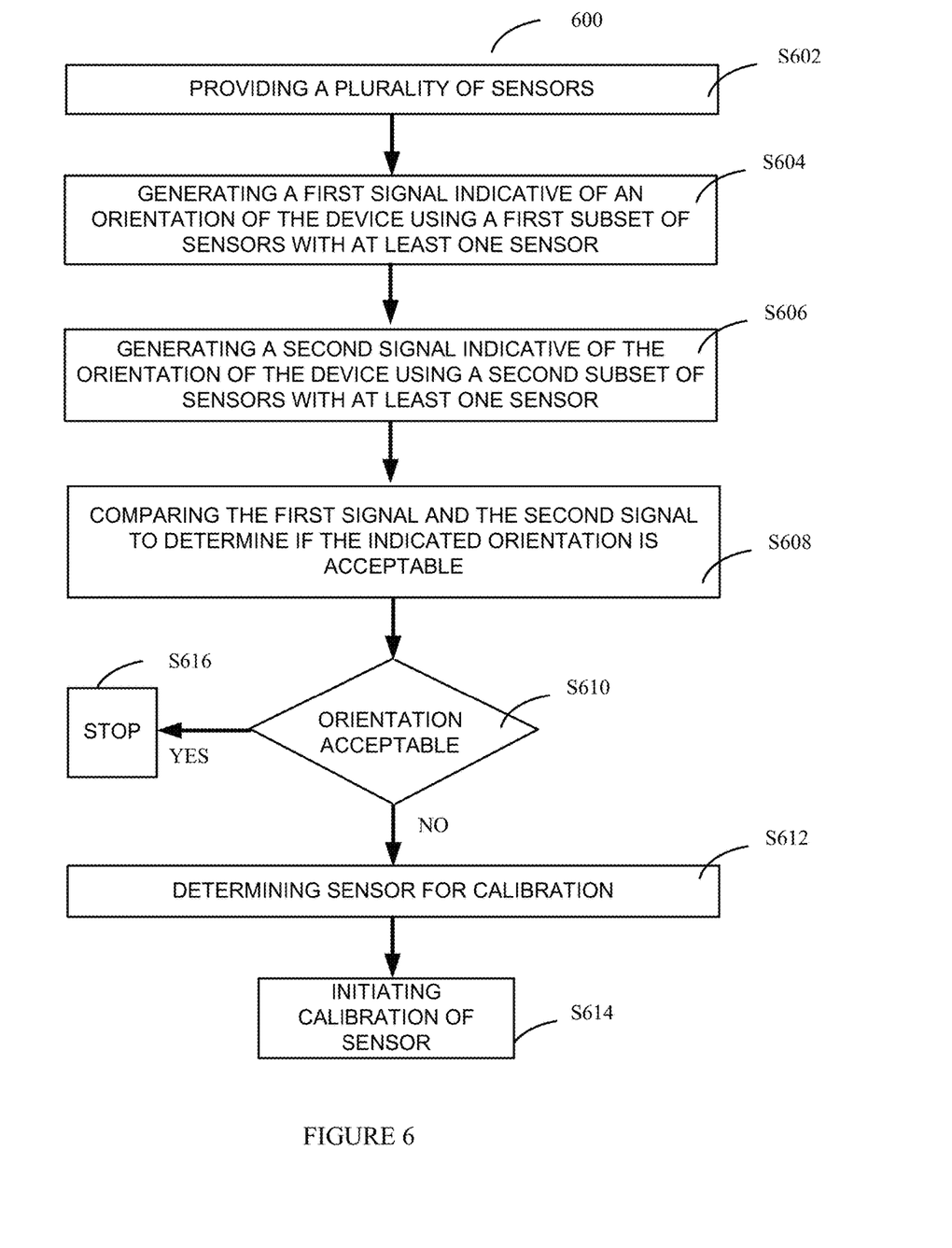
FIG. 6 shows a flow diagram to initiate a calibration of one or more sensors, according to one aspect of the present disclosure.

Now, referring to FIG. 6, an example flow diagram 600 will be described. In block S602, a plurality of sensors are provided. For example, a plurality of sensors 302a, 302b and 302c are provided.

In block S604, a first signal indicative of an orientation of the device using a first subset of sensors with at least one sensor is generated. For example, first orientation module 308 generates first signal 312, based on the signals from a first subset of sensors.

In block S606, a second signal indicative of an orientation of the device using a second subset of sensors with at least one sensor is generated. For example, second orientation module 310 generates second signal 314, based on the signals from a second subset of sensors.

In block S608, the first signal and the second signal are compared to determine if the difference indicative of an orientation error is acceptable. For example, the orientation compare logic 316 may compare the first signal and second signal to determine if the difference indicative of orientation error is acceptable. For example, the orientation compare logic 316 may compare the orientation value indicated by the first signal 312 and the orientation value indicated by the second signal 314. In one example, the first signal and the second signal represent a quaternion. A dot product of the quaternion indicates a cosine of the angle error between the orientation indicated by the first signal 312 and the orientation indicated by the second signal 314.

In block S610 the difference in orientation is compared to a threshold value. In one example, the orientation compare logic 316 may perform the comparison. For example, the cosine of the angle error is compared to a threshold value. If the cosine of the angle error is greater than a threshold value, then, the indicated orientation is acceptable. If so, in block S616, no further action is taken. Other criteria indicative of a difference of the two orientations may be used as described above.

If the cosine of the angle error is less than a threshold value, the indicated orientation is not acceptable. If so, in block S612, the sensor for calibration is determined. For example, decision logic 318 may determine sensor for calibration, based on the first signal and second signal. In some examples, one or more samples of the first signal and the second signal may be generated by using different combinations of the first subset of sensors and second subset of sensors, for example, as shown with reference to table 340 and table 360. Based on the difference in orientation by various combinations of the first subset of sensors and second subset of sensors, using the decision table 360, one or more sensors may be identified for calibration.

Based on the determination in block S612, in block S614, calibration of the identified sensor is initiated. In one example, the calibration may be performed by the MPU 408. In yet another example, MPU 408 may send a signal to the application processor 404 to initiate a calibration of the identified sensor. Then, the application processor 404 may initiate the calibration of the identified sensor.

In some examples, after calibration, the indicated orientation of the first subset of sensors and the second subset of sensors are reset to be same. In this case, we assume that the orientation based on the subset that included a sensor that needed to be calibrated, was incorrect. Once the sensor has been calibration, the orientation of that subset can be set equal to the orientation determined using the other subset, which is assumed to be the correct orientation. In some examples, after a predefined elapsed time, the indicated orientation of the first subset of sensors and the second subset of sensors are reset to be same. As the sensor data are measurements, there are errors on the measurements which lead to errors in the orientation. For example, noise or small offsets on the sensor data might introduce small errors of the orientation, which over time may grow. In the absence of movement, these small difference in orientation based on different subsets may be corrected by resetting the orientation of the first subset of sensors and the second subset of sensors to be same.

Now, referring back to FIG. 3, in some examples, only output of a single sensor that is part of the first subset or the second subset may be used to determine if a calibration is required. For example, output of one of the sensors is measured. For example, one of the sensors 302a, 302b or 302c. The measured output is compared to a threshold value. If the output of the sensor is above a threshold value, then a calibration of the sensor is initiated.

In some examples, the sensor may be an accelerometer. The output of the accelerometer may be above a threshold, due to excessive external shock. For example, if the acceleration exceeds the range of the accelerometer, a calibration might be started. In some examples, the sensor may be a compass. The output of the compass may be above a threshold, due to excessive external magnetic field. For example, if the external field exceeds 1000 µT over a period over 30 seconds, the magnetometer calibration might be started. In some examples, the sensor may be a gyroscope. The output of the gyroscope may be above a threshold, due to an excessive external rotation.

The external factor may either lead directly to a recalibration of the sensor in question, or may launch the procedure to test if a calibration is necessary by selecting the correct subsets of sensors to test if the sensor actually needs to be testing.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for determining orientation of a device, comprising:
providing a plurality of sensors;
generating a first signal indicative of an orientation of the device with reference to a stationary frame, using at least a first subset of sensors, with at least one sensor;
generating a second signal indicative of the orientation of the device with reference to the stationary frame, using at least a second subset of sensors, with at least one sensor; and
comparing the first signal indicative of the orientation of the device with reference to the stationary frame generated using the at least the first subset of sensors and the second signal indicative of the orientation of the device with reference to the stationary frame generated using the at least the second set of sensors to determine if indicated orientation of the device is acceptable.

2. The method of claim 1, wherein if the indicated orientation of the device is not acceptable, calibrating one or more of the sensors.

3. The method of claim 1, wherein the first subset of sensors and the second subset of sensors each generate a signal indicative of the orientation,
converting the signal indicative of the orientation generated by the first subset of sensors to the first signal indicative of the orientation of the device with reference to the stationary frame; and
converting the signal indicative of the orientation generated by the second subset of sensors to the second signal indicative of the orientation of the device with reference to the stationary frame.

4. The method of claim 3, wherein the first signal and second signal are represented as a quaternion.

5. The method of claim 4, wherein the comparing of the first signal represented as a quaternion and indicative of the orientation of the device with reference to the stationary frame and second signal represented as a quaternion and indicative of the orientation of the device with reference to the stationary frame is performed by a dot product of the first signal and the second signal and wherein the dot product if within a threshold value indicates the orientation of the device is acceptable.

6. The method of claim 5, wherein if the dot product is outside the threshold value, then initiating a calibration.

7. The method of claim 5, further including determining a confidence level value based on the dot product of the first signal represented as a quaternion and indicative of the orientation of the device with reference to the stationary frame and the second signal represented as a quaternion and indicative of the orientation of the device with reference to the stationary frame.

8. The method of claim 4, wherein the first signal and the second signal are represented as a rotation matrix.

9. The method of claim 4, wherein the first signal and the second signal are represented using Euler angles.

10. The method of claim 1, wherein the plurality of sensors includes at least one or more of a gyroscope, an accelerometer and a magnetometer.

11. The method of claim 10, wherein the first set of sensors used to generate the first signal includes a gyroscope and an accelerometer and the second set of sensors used to generate the second signal includes a magnetometer and an accelerometer and if the first signal and the second signal are within a predefined threshold value, then concluding that all of the gyroscope, accelerometer and the magnetometer outputs are within an acceptable value, if not concluding that one or more of the sensor outputs are not within an acceptable value.

12. The method of claim 10, wherein the first set of sensors used to generate the first signal includes a gyroscope and the second set of sensors used to generate the second signal includes a compass and an accelerometer and if the first signal and the second signal are within a predefined threshold value, then concluding that all of the gyroscope, accelerometer and the magnetometer outputs are within an acceptable value, if not concluding that one or more of the sensor outputs are not within an acceptable value.

13. The method of claim 10, further including
confirming that the first signal and the second signal are within a predefined threshold value when the first subset of sensors used to generate the first signal includes an accelerometer and a compass and the second subset of sensors used to generate the second signal includes a gyroscope, magnetometer and an accelerometer;
confirming that the first signal and the second signal are not within a predefined threshold value when the first subset of sensors used to generate the first signal includes a gyroscope and the second set of sensors used to generate the second signal includes a gyroscope, magnetometer and an accelerometer; and
concluding that the gyroscope output is out of range.

14. The method of claim 10, further including
confirming that the first signal and the second signal are within a predefined threshold value when the first subset of sensors used to generate the first signal includes a gyroscope and the second subset of sensors used to generate the second signal includes a gyroscope and an accelerometer;
confirming that the first signal and the second signal are not within a predefined threshold value when the first set of sensors used to generate the first signal includes a gyroscope and the second set of sensors used to generate the second signal includes a gyroscope, magnetometer and an accelerometer; and
concluding that the magnetometer output is out of range.

15. The method of claim 10, further including
confirming that the first signal and the second signal are within a predefined threshold value when the first set of sensors used to generate the first signal includes a gyroscope and the second set of sensors used to generate the second signal includes a gyroscope and an accelerometer;
confirming that the first signal and the second signal are not within a predefined threshold value when the first set of sensors used to generate the first signal includes a gyroscope and an accelerometer and the second set of sensors used to generate the second signal includes a gyroscope, magnetometer and an accelerometer; and
concluding that the magnetometer output is out of range.

16. The method of claim 2, further including resetting the indicated orientation by the first set of sensors and the second set of sensors to be substantially same.

17. The method of claim 1, further including resetting the indicated orientation by the first set of sensors and the second set of sensors substantially same, after a predefined elapsed time.

18. A system to determine orientation of a device, comprising:
a plurality of sensors;
a first signal indicative of an orientation of the device with reference to a stationary frame generated using at least a first subset of sensors, with at least one sensor;
a second signal indicative of the orientation of the device with reference to the stationary frame generated using at least a second subset of sensors, with at least one sensor; and
an orientation compare logic to compare the first signal indicative of the orientation of the device with reference to the stationary frame generated using the at least the first subset of sensors and the second signal indicative of the orientation of the device with reference to the stationary frame generated using the at least the second subset of sensors to determine if indicated orientation of the device is acceptable.

19. The system of claim 18, wherein if the indicated orientation of the device is not acceptable, one or more of the sensors are calibrated.

20. The system of claim 18, wherein the first subset of sensors and the second subset of sensors each generate a signal indicative of the orientation,
the signal indicative of the orientation generated by the first subset of sensors is converted to the first signal indicative of the orientation of the device with reference to the stationary frame; and
the signal indicative of the orientation generated by the second subset of sensors is converted to the second signal indicative of the orientation of the device with reference to the stationary frame.

21. The system of claim 20, wherein the first signal and second signal are represented as a quaternion.

22. The system of claim 21, wherein the comparison of the first signal represented as a quaternion and indicative of the orientation of the device with reference to the stationary frame and second signal represented as a quaternion and indicative of the orientation of the device with reference to the stationary frame is performed by a dot product of the first signal and the second signal and wherein the dot product if within a threshold value indicates the orientation of the device is acceptable.

23. The method of claim 22, wherein if the dot product is outside the threshold value, then calibration is initiated.

24. The system of claim 21, wherein a confidence level value is determined based on the dot product of the first signal represented as a quaternion and indicative of the orientation of the device with reference to the stationary frame and the second signal represented as a quaternion and indicative of the orientation of the device with reference to the stationary frame.

25. The system of claim 20, wherein the first signal and the second signal are represented as a rotation matrix.

26. The system of claim 20, wherein the first signal and the second signal are represented using Euler angles.

27. The system of claim 18, wherein the plurality of sensors includes at least one or more of a gyroscope, an accelerometer and a magnetometer.

28. The system of claim 27, wherein the first set of sensors used to generate the first signal includes a gyroscope and an accelerometer and the second set of sensors used to generate the second signal includes a magnetometer and an accelerometer and if the first signal and the second signal are within a predefined threshold value, then concluding that all of the gyroscope, accelerometer and the magnetometer outputs are within an acceptable value, if not concluding that one or more of the sensor outputs are not within an acceptable value.

29. The system of claim 27, wherein the first set of sensors used to generate the first signal includes a gyroscope and the second set of sensors used to generate the second signal includes a compass and an accelerometer and if the first signal and the second signal are within a predefined threshold value, then concluding that all of the gyroscope, accelerometer and the magnetometer outputs are within an acceptable value, if not concluding that one or more of the sensor outputs are not within an acceptable value.

30. The system of claim 27, further including confirming that the first signal and the second signal are within a predefined threshold value when the first subset of sensors used to generate the first signal includes an accelerometer and a magnetometer and the second subset of sensors used to generate the second signal includes a gyroscope, magnetometer and an accelerometer;

confirming that the first signal and the second signal are not within a predefined threshold value when the first subset of sensors used to generate the first signal includes a gyroscope and the second set of sensors includes a gyroscope, magnetometer and an accelerometer; and concluding that the gyroscope output is out of range.

31. The system of claim 27, further including confirming that the first signal and the second signal are within a predefined threshold value when the first subset of sensors used to generate the first signal includes a gyroscope and the second subset of sensors used to generate the second signal includes a gyroscope and an accelerometer;

confirming that the first signal and the second signal are not within a predefined threshold value when the first set of sensors used to generate the first signal includes a gyroscope and the second set of sensors used to generate the second signal includes a gyroscope, magnetometer and an accelerometer; and concluding that the magnetometer output is out of range.

32. The system of claim 19, further including resetting the indicated orientation by the first set of sensors and the second set of sensors to be substantially same.

33. The system of claim 27, further including confirming that the first signal and the second signal are within a predefined threshold value when the first set of sensors used to generate the first signal includes a gyroscope and the second set of sensors used to generate the second signal includes a gyroscope and an accelerometer;

confirming that the first signal and the second signal are not within a predefined threshold value when the first set of sensors used to generate the first signal includes a gyroscope and an accelerometer and the second set of sensors used to generate the second signal includes a gyroscope, magnetometer and an accelerometer; and concluding that the magnetometer output is out of range.

34. The system of claim 19, further including resetting the indicated orientation by the first set of sensors and the second set of sensors substantially same, after a predefined elapsed time.

* * * * *